United States Patent [19]
Yamaguchi et al.

[11] Patent Number: 5,553,043
[45] Date of Patent: Sep. 3, 1996

[54] INFORMATION REGENERATING APPARATUS

[75] Inventors: Takeshi Yamaguchi, Sakai; Hiroshi Fuji, Soraku-gun; Hiroshige Hirashima; Shigeo Terashima, both of Tenri, all of Japan

[73] Assignee: Sharp Kabushiki Kaisha, Osaka, Japan

[21] Appl. No.: 358,073

[22] Filed: Dec. 15, 1994

[30] Foreign Application Priority Data

Dec. 17, 1993 [JP] Japan .................................. 5-318105

[51] Int. Cl.$^6$ ........................................................ G11B 7/00
[52] U.S. Cl. ................................ 369/50; 369/48; 369/58; 369/124
[58] Field of Search ...................... 369/58, 59, 60, 369/47, 48, 49, 32, 124, 50, 54

[56] References Cited

U.S. PATENT DOCUMENTS

| | | | |
|---|---|---|---|
| 5,388,087 | 2/1995 | Saiki et al. | 369/50 X |
| 5,444,685 | 8/1995 | Masood et al. | 369/54 X |
| 5,448,543 | 9/1995 | Mizokami et al. | 369/54 |

FOREIGN PATENT DOCUMENTS 4-162263  6/1992  Japan .

*Primary Examiner*—Georgia Y. Epps
*Assistant Examiner*—Muhammad N. Edun
*Attorney, Agent, or Firm*—David G. Conlin; Brian L. Michaelis

[57] ABSTRACT

In an information regenerating apparatus, recorded data constructed of a sector mark and a following header section having a plurality of data sets each having a pull-in pattern, an address mark and address information, is read out to form a regenerative signal which in turn is used to regenerate information. A phase-locked loop circuit in a signal synchronizing circuit, performs phase-synchronization with a regenerative signal at two different pull-in speeds. A speed indicating circuit, based on the counting of the number of clock pulses from a reference clock signal from a time of the generation of a sector mark detection signal showing the detection of the sector mark as a reference point, instructs the phase-locked loop circuit to set up a fast response speed every time the pull-in pattern appears on the regenerative signal, and instructs the phase-locked loop circuit to set up a slow response speed every time the pull-in pattern disappears from the regenerative signal.

3 Claims, 5 Drawing Sheets

INFORMATION REGENERATING APPARATUS

BACKGROUND OF THE INVENTION (1) Field of the Invention

The present invention relates to an information regenerating apparatus wherein recorded data constructed of a sector mark and a following header section having a plurality of data sets each having a pull-in pattern, an address mark and address information, is read out to form a regenerative signal which in turn is used to regenerate information.

(2) Description of the Prior Art

An optical disc system is known as one of image regenerating apparatuses which trace tracks formed on a recording medium and thereby read out data recorded on tracks. In the system, after predetermined signal processing is performed, the data recorded on tracks is regenerated by using a clock signal that is produced in correspondence with the readout speed of the data recorded using a phase-locked loop circuit (to be abbreviated as a PLL circuit hereinafter). In the system, this PLL circuit is constructed so as to be able to operate at two levels of response speeds, so that the clock signal to be produced may be pulled in quickly to the frequency of the input signal while influences of noises etc. are reduced after the completion of the pull-in operation.

That is, in performing phase-synchronization with respect to a pull-in pattern (to be referred to hereinafter as a VFO pattern), the PLL circuit effects phase-synchronization at a fast response speed. On the other hand, when the circuit detects a pattern "100" in the VFO pattern at a predetermined number of times, the circuit judges that the pull-in process is over and changes the response speed of phase-synchronization to a slow level.

Nevertheless, if the regenerative signal is deteriorated or if there are defects, even fine ones on the recording medium, it becomes impossible for the circuit to perform the successive detection of the pattern "100" contained in the VFO pattern so that the number of detection of the pattern could not reach the predetermined number. When such a failure occurs in the above configuration, the PLL circuit happens to perform phase-synchronization at the fast response speed for bit strings of address information or user information coming next to the VFO pattern. In this case, if the regenerative signal contains defects due to failures of the recording medium or any other reason, the PLL circuit tends to follow or pick up the defects because of the fast response speed. Consequently, the state of synchronization tends to become unstable so that there is a fear that burst errors take place.

In order to solve this problem, a method has been proposed in Japanese Patent Application Laid-Open Hei 4 No. 162,263. This prior art method will now be described with reference to FIG. 1.

In the configuration according to the prior art, a mono-stable multi-vibrator 96 for measuring a time substantially equal to a pickup duration for the VFO pattern is provided as a signal generator of producing a signal for switching the response speed of a PLL circuit 95. A read gate signal 91 instructing a start of pickup is inputted to the mono-stable multi-vibrator 96. A latch 97 reads the data of a regenerative signal 92 in synchronization with a clock signal produced in the PLL circuit 95 and sends out the picked up data as an output 94.

In the above configuration, when the read gate signal 91 instructs the PLL circuit 95 to start the operation, the mono-stable multi-vibrator 96 starts measurement. Here, the operation start of the PLL circuit 95 is instructed by controlling a switch 98 so that the signal to be supplied to the PLL circuit 95 is changed over from a reference clock 93 to a regenerative signal 92. As a result, the PLL circuit 95 performs phase-synchronization for the VFO pattern at a fast response speed in the beginning of the operation, and when the mono-stable multi-vibrator 96 has completed the measurement of a predetermined time, the circuit 95 performs phase-synchronization at a slow response speed.

In other words, the PLL circuit 95 performs fast response speed phase-synchronization for VFO patterns and at the time of picking up the data in image information area the circuit 95 starts to effect slow response speed phase-synchronization even if a predetermined length of the VFO pattern was not detected due to defects in the recording medium or any other reason.

The above-stated conventional configuration, however, suffers the following problems, especially in the case where data recorded on a recording medium is constructed in such a manner as designated by a reference numeral 57 in FIG. 4 hereinbelow, that a sector mark 571 is followed by a header section 572 to 575 which contains plural data sets each consisting of a VFO pattern 572, an address mark 573 and address information 574.

That is, it is possible for the PLL circuit 95 to perform fast response speed phase-synchronization for a first VFO pattern 572a following the sector mark 571, but the PLL circuit 95 effects phase-synchronization for subsequently appearing VFO patterns 572 at a slow response speed. Therefore, it takes long time to finish the phase-synchronization, and the phase-synchronization for the VFO pattern cannot be completed during the duration for picking up VFO patterns 572, thereby resulting in incapacity for picking up the following address information 574.

Further, there is another problem. That is, as the PLL circuit 95 can effect fast response speed phase-synchronization at the start of operation until the monostable multi-vibrator 96 completes the measurement of the predetermined time, the circuit 95 continues to stay in the fast phase-synchronization mode even after the completion of the phase-synchronization. Therefore, if the regenerative signal contains any fine defect in this duration, the PLL circuit 95 tends to become unstable.

SUMMARY OF THE INVENTION

The present invention has been achieved to solve the above problems, and it is therefore an object of the present invention to provide an information regenerating apparatus capable of effecting phase-synchronization at a fast response speed with all VFO patterns and effecting phase-synchronization at a slow response speed with all information areas.

To achieve the above object, a first aspect of the present invention resides in that an information regenerating apparatus wherein recorded data constructed of a sector mark and a following header section having a plurality of data sets each having a pull-in pattern, an address mark and address information, is read out to form a regenerative signal which in turn is used to regenerate information, comprises: a phase-locked loop circuit for performing phase-synchronization with the regenerative signal at two different pull-in speeds; and a speed indicating circuit which, based on the counting of the number of clock pulses from a reference clock signal from a time of the generation of a sector mark detection signal showing the detection of the sector mark as a reference point, instructs the phase-locked loop circuit to set up a fast response speed every time the pull-in pattern appears on the regenerative signal, and which instructs the phase-locked loop circuit to set up a slow response speed every time the pull-in pattern disappears from the regenerative signal.

A second aspect of the present invention resides in that an information regenerating apparatus wherein recorded data constructed of a sector mark and a following header section having a plurality of data sets each having a pull-in pattern, an address mark and address information, is read out to form a regenerative signal which in turn is used to regenerate information, comprises: a phase-locked loop circuit for performing phase-synchronization with the regenerative signal at two different pull-in speeds; a mark detecting circuit which detects the address mark on synchronized data obtained by sampling the regenerative signal in synchronization with a regenerative clock produced in the phase-locked loop circuit; and a speed indicating circuit which, based on the counting of the number of clock pulses from a reference clock signal from a time of the generation of a sector mark detection signal showing the detection of the sector mark as a reference point, gives an instruction to the phase-locked loop circuit to accelerate the response speed thereof every time the pull-in pattern appears on the regenerative signal, and which instructs the phase-locked loop circuit to slow down the response speed thereof every time the mark detecting circuit indicates the detection of an address mark.

A third aspect of the present invention lies in an information regenerating apparatus wherein recorded data having a sector mark, a following header section having data sets consisting of pull-in patterns, address marks and address information, and a data section having a data set of a pull-in pattern, a data mark and user information, is read out to form a regenerative signal which in turn is used to regenerate information, comprises: a phase-locked loop circuit for performing phase-synchronization with the regenerative signal at two different pull-in speeds; a synchronizing pattern detecting circuit for detecting a pull-in pattern; and a speed indicating circuit which, based on the counting of the number of clock pulses from a reference clock signal from a time of the generation of a sector mark detection signal showing the detection of the sector mark as a reference point, instructs the phase-locked loop circuit to set up a fast response speed every time the pull-in pattern appears on the regenerative signal, and which instructs the phase-locked loop circuit to set up a slow response speed when the synchronizing pattern detecting circuit detects a pull-in pattern or when the pull-in pattern disappears from the regenerative signal.

Next, the operation of the apparatus according to the first aspect of the present invention will be described.

Recorded data is constructed of a sector mark and a following header section having a plurality of data sets each having a pull-in pattern (to be referred hereinafter to as a VFO pattern), an address mark and address information. Therefore, when the recorded data is read out, timings of each VFO appearing and ending can be known by referring to the detection of the sector mark as a starting point.

Accordingly, the speed indicating circuit measures the timings of each VFO pattern appearing and ending by counting the number of clock pulses from a reference clock signal from a time of the generation of a sector mark detection signal showing the detection of the sector mark as a starting point. Then, based on the measured result, the speed indicating circuit instructs the phase-locked loop circuit (to be referred hereinafter to as a PLL circuit) to set up a fast response speed when a first VFO pattern appears and instructs the PLL circuit to set up a slow response speed when the VFO pattern ends.

Further, the speed indicating circuit, after pickup of the first VFO pattern, address mark and address information has been completed, instructs the PLL circuit to set up the fast response speed at the time of a next VFO pattern appearing and then gives an instruction to set up the slow response speed at the time of the VFO pattern ending. Thereafter, in conformity with the number of data sets of VFO patterns, address marks, address information which depends upon the data structure, the speed indicating circuit gives an instruction to the PLL circuit to set up the fast response speed at the time of a VFO pattern appearing and gives an instruction to set up the slow response speed at the time of the VFO pattern disappearing.

Next, the operation of the apparatus according to the second aspect of the present invention will be described.

Recorded data is constructed of a sector mark and a following header section having a plurality of data sets each having a VFO pattern, an address mark and address information. Therefore, when the recorded data is read out, timings of each VFO appearing and ending can be known by referring to the detection of the sector mark as a starting point.

Accordingly, the speed indicating circuit measures the timings of each VFO pattern appearing and ending by counting the number of clock pulses from a reference clock signal from a time of the generation of a sector mark detection signal showing the detection of the sector mark as a starting point. Then, based on the measured result, the speed indicating circuit instructs the PLL circuit to set up a fast response speed at a time a first VFO pattern appears. During the phase-synchronization at the fast response speed in the PLL circuit, the mark detecting circuit detects an address mark, the speed indicating circuit indicates the detection as the end of the pickup of the VFO pattern and instructs the PLL circuit to set up a slow response speed.

Thereafter, the speed indicating circuit gives instructions to the PLL circuit to set up the fast response speed at the time of a next VFO pattern appearing and to set up the slow response speed at the time an address mark is detected.

Next, the operation of the apparatus according to the third aspect of the present invention will be described.

Recorded data is constructed of a sector mark, a following header section having data sets of VFO patterns, address marks and address information, and a data section having a data set of a pull-in pattern, a data mark and user information. Therefore, when the recorded data is read out, timings of each VFO appearing and ending can be known by referring to the detection of the sector mark as a starting point.

Accordingly, the speed indicating circuit measures the timings of each VFO pattern appearing and ending by counting the number of clock pulses from a reference clock signal from a time of the generation of a sector mark detection signal showing the detection of the sector mark as a starting point. Then, based on the measured result, the speed indicating circuit instructs the phase-locked loop circuit to set up a fast response speed when a VFO pattern appears. Thereafter, the speed indicating circuit instructs the PLL circuit to set up a slow response speed when the synchronizing pattern detecting circuit detects a VFO pattern or when the VFO pattern ends.

DESCRIPTION OF THE PREFERRED EMBODIMENTS

Embodiments of the present invention will hereinafter be described with reference to the accompanying drawings.

First of all, description will be made as to a construction of recorded data to be applied to the embodiment of the present invention.

Figure 4:
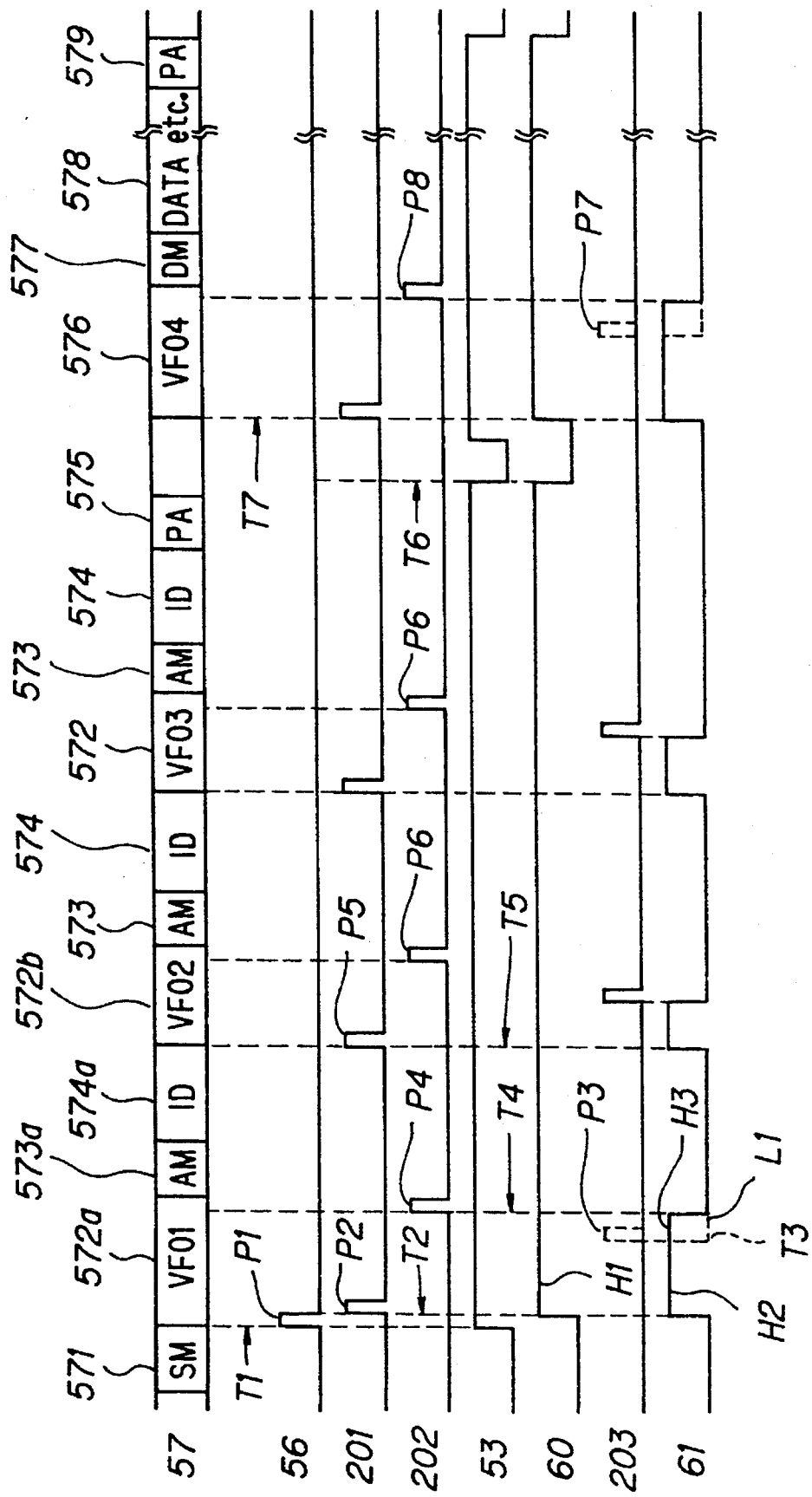
FIG. 4 is a timing chart showing a construction of 10 recorded data and timings of essential signals to be applied to the present invention.

Data recorded on an optical disc is composed of, as designated by a reference numeral 57 in FIG. 4, a header section including components designated at 571 through 575, and a data section including components designated at 576 through 579.

The header section has a sector mark 571 recorded at the front end thereof. This sector mark 571 is followed by three data sets each consisting of a VFO pattern 572 representing a pull-in pattern, an address mark 573 indicating a starting position of address information and address information 574 indicating an address of the sector. In the end of the header section, a post-amble 575 is recorded which represents the end of the header section.

The data section has a VFO pattern 576 representing a pull-in pattern recorded at the front end thereof, which is followed by a data mark 577 indicating a starting position of data. Subsequently, data information 578 is recorded which includes user information, an error correction parity (ECC), an error detection parity (CRC) etc. In the end of the data section, a post-amble 579 showing the end of the data section is recorded.

The address information 574 as well as data information 578 comprises a recorded bit string which is generated from a data bit string by digital modulation such as (2,7) RLL-modulation etc. Digital data "1" in the recorded bit string is recorded in a track on the optical disc as a recording medium in a form of inter-mark recording.

As stated herein, the embodiment of the present invention uses an optical disc as the recording medium.

Figure 1:
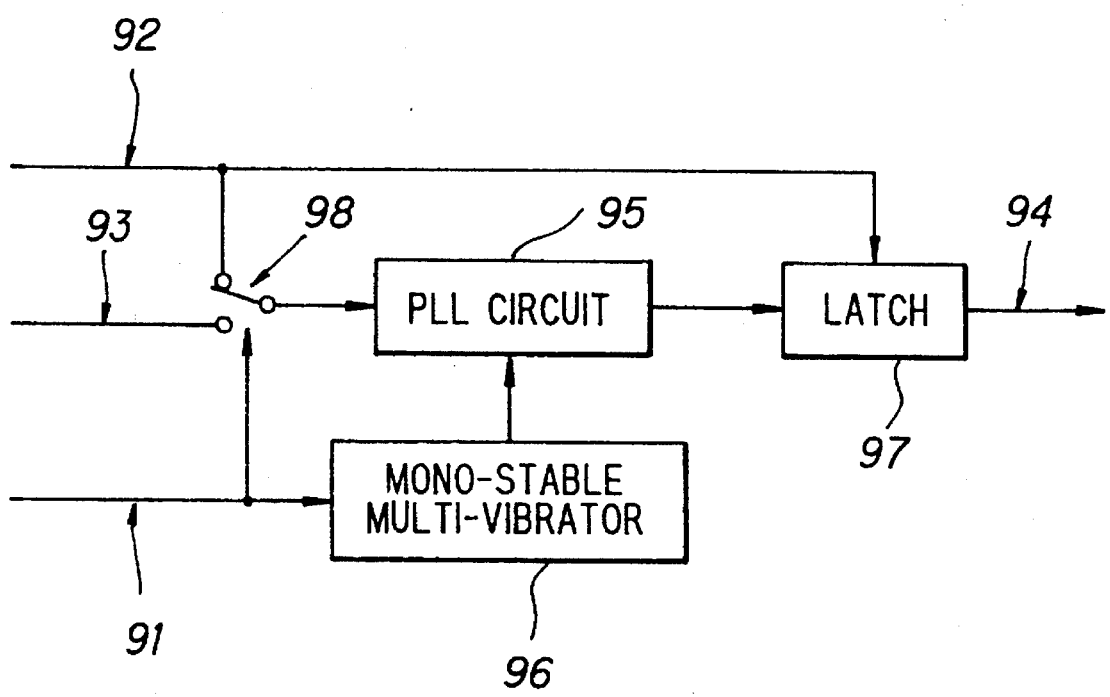
FIG. 1 a block diagram showing an electric configuration of a prior art technology.
Figure 2:
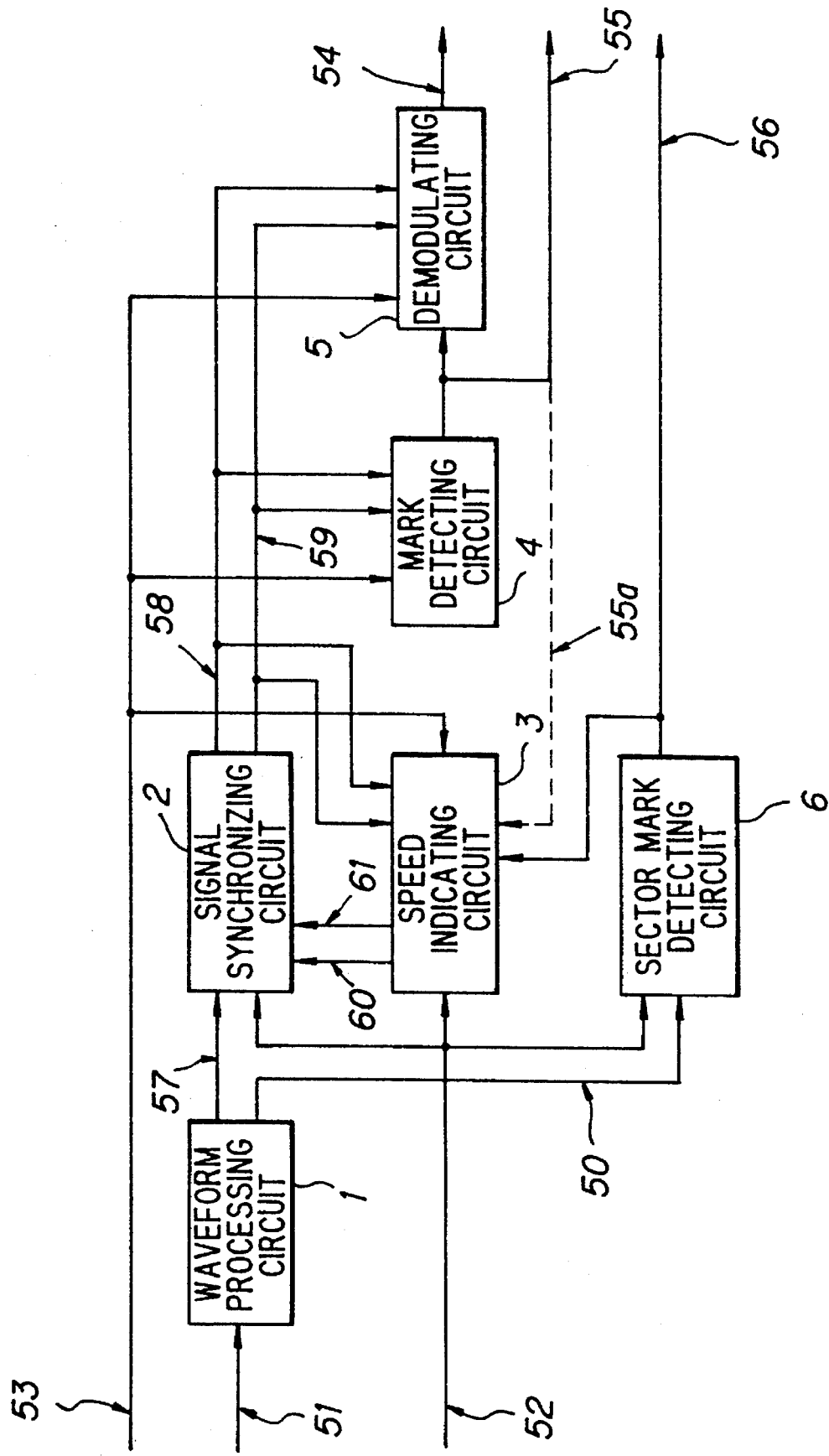
FIG. 2 is a block diagram showing an electric configuration of an information regenerating apparatus in association with first, second and third embodiments of the present invention.

FIG. 2 is a block diagram showing an electric configuration of an information regenerating apparatus in association with first and third embodiments of the present invention.

In the figure, a regenerative signal 51 transmitted from an optical head for regenerating data on the optical disc is introduced to a waveform processing circuit 1 where a filtering process for removing high-frequency noise components contained in the regenerative signal 51 is effected and the signal is shaped into binary form so as to output two kinds of binary regenerative signals 57 and 50. Of the thus generated binary regenerative signals 57 and 50, the binary regenerative signal 57 is delivered to a signal synchronizing circuit 2 whereas the binary regenerative signal 50 is sent out to a sector mark detecting circuit 6.

Here, the binary regenerative signal 57 delivered to the signal synchronization circuit 2 is composed as of representing presence of marks formed on the optical disc and therefore the signal form is composed of pulses each of which corresponds to a recorded bit "1". As to the binary regenerative signal 50 sent out to the sector mark detecting circuit 6, the signal form is constructed so that the signal is kept at H-level during the marks are continual.

When the sector mark detecting circuit 6 detects a sector mark appearing in the binary regenerative signal, it produces a sector mark detection signal 56, which is sent out to a speed indicating circuit 3 as well as to an unillustrated controller.

On the other hand, a reference clock signal 52 which is provided to the signal synchronizing circuit 2, the speed indicating circuit 3 and the sector mark detecting circuit 6, is a clock signal substantially corresponding to the bit rate of the bit strings recorded on the optical disc being regenerated. Therefore, the sector mark detecting circuit 6 counts the numbers of the clock pulses on the reference clock signal 52 for measuring the H-level duration and the L-level duration appearing in the binary regenerative signal 50. When the sector mark detecting circuit 6, based on the counted result, detects that a mark length and an interval length reach predetermined values respectively, the circuit makes a reaction that a sector mark 571 has been detected.

The signal synchronizing circuit 2 has a phase-locked loop circuit (to be referred to hereinbelow as a PLL circuit) thereinside and its operation is controlled by a read gate signal 53 transmitted from an unillustrated controller. The signal synchronizing circuit 2 effects phase-synchronization of the clock signal with the binary regenerative signal 57 at two different pull-in speeds when phase-synchronization is operated. The thus phase-synchronized clock signal is outputted as a regenerative clock signal 59, which in turn is used to sample the binary regenerative signal 57 to thereby produce synchronized data 58.

The synchronized data 58 produced in the signal synchronizing circuit 2 as well as the regenerative clock signal 59 is sent out to each of the speed indicating circuit 3, a mark detecting circuit 4 and a demodulating circuit 5.

The speed indicating circuit 3 counts the number of clock pulses from the reference clock signal 52 from a time of the generation of the sector mark detection signal 56 showing the detection of a sector mark 571 as a reference point to take timings of appearance and disappearance of a VFO pattern 572 in the binary regenerative signal 57 and deliver outputs 60,61. The outputs 60, 61 are used to instruct the PLL circuit in the signal synchronizing circuit 2 to make the response speed fast at every timing a VFO pattern 572 appears. Further, these outputs are used to instruct the PLL circuit in the signal synchronizing circuit 2 to make the response speed slow at every timing a VFO pattern 572 disappears.

The mark detecting circuit 4 and the demodulating circuit 5 are blocks whose operations are regulated by the read gate signal 53. The mark detecting circuit 4 detects address marks 573 and data marks 577 on bit strings of the synchronized data 58 by using a pattern correspondence detecting technique. When detecting any of these marks, the mark detecting circuit 4 generates an AM/DM detecting signal 55 that commands the detection and outputs it to both the demodulating circuit 5 and the outside.

As receiving a command of the mark detection by the AM/DM detecting signal 55, the demodulating circuit 5 subjects the bit strings of the synchronized data 58 to a predetermined process so as to demodulate the data. The thus extracted data is sent outside as demodulated data 54.

As to FIG. 2, although there is a broken line 55a which connects the AM/DM detecting signal 55 and the speed indicating circuit 3, this connection is not used in this embodiment but for the case of a second embodiment of the present invention.

Figure 3:
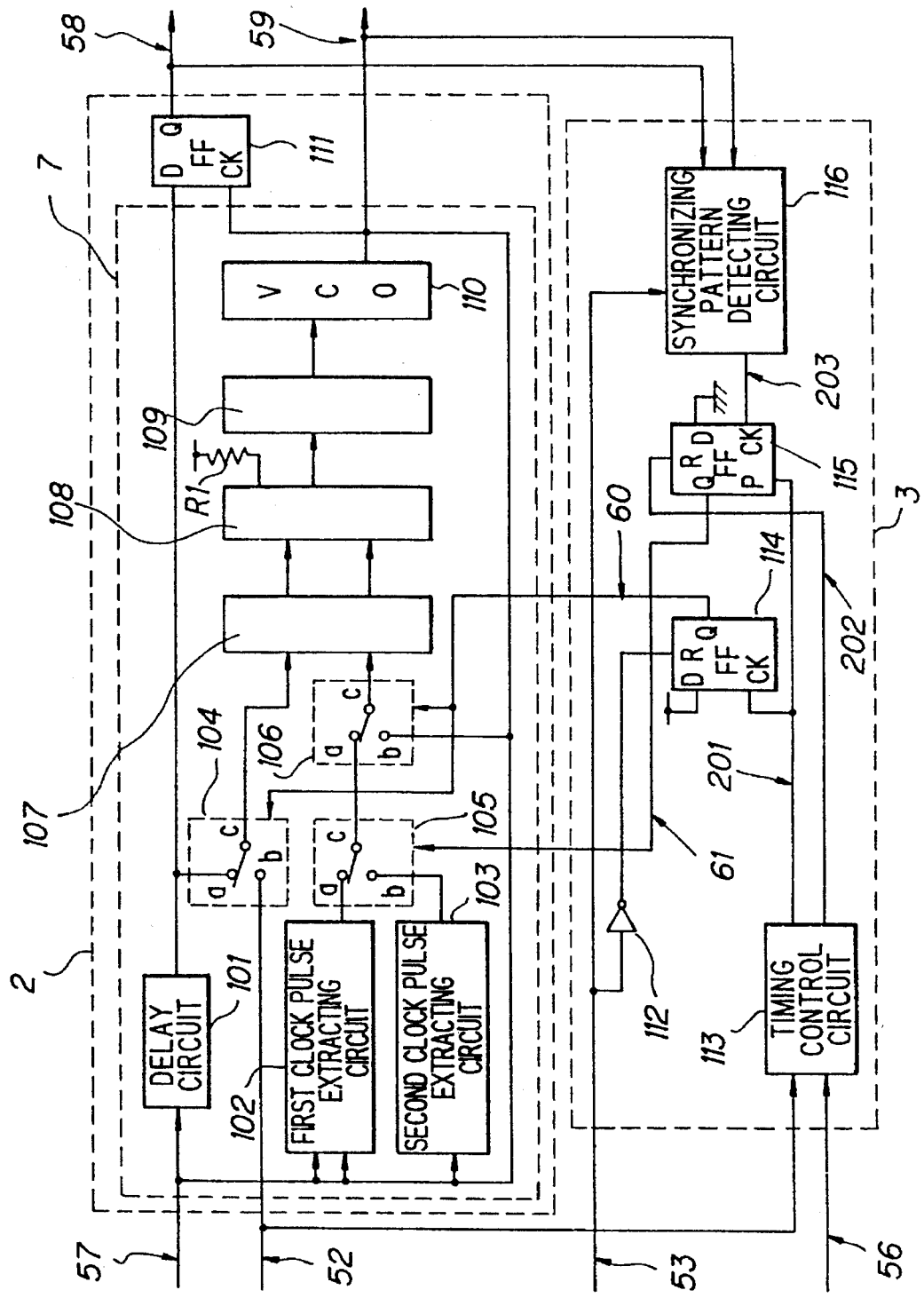
FIG. 3 is a block diagram showing a detailed electric construction of a signal synchronizing circuit and a speed indicating circuit which can be applied to the information regenerating apparatus shown in FIG. 2 as used for the first or third embodiment.

FIG. 3 is a block diagram showing a detailed electric configuration of the signal synchronizing circuit 2 and the speed indicating circuit 3.

The binary regenerative signal 57 is introduced to one of input terminals to a first clock pulse extracting circuit 102 as well as to a delay circuit 101 while the regenerative clock signal 59 is introduced to the other input terminal to the first clock pulse extracting circuit 102 and a second clock pulse extracting circuit 103. The delay circuit 101 causes a definite delay with respect to the binary regenerative clock signal 57 introduced in order to compensate delays (to be described later) caused in the clock pulses extracting circuits 102 and 103.

The first clock pulse extracting signal 102 is a block which extracts one pulse from pulse trains of the regenerative clock signal 59 and outputs it every time any pulse appears on the binary signal regenerative signal 57. The second clock extracting pulse signal 103 is a block which extracts one pulse from every three pulse of the pulse trains of the regenerative clock signal 59 and outputs it.

A multiplexer 104 is a switch for selecting one from the output from the delay circuit 101 and the reference clock signal 52 so as to output the selected one to a first input terminal to a phase-comparing circuit 107. Another multiplexer 105 is a switch for selecting one from the output from the first clock pulse extracting circuit 102 and the output from the second clock pulse extracting circuit 103 so as to output the selected one to one of input terminals to a multiplexer 106. The multiplexer 106 is a switch for selecting one from the output from the multiplexer 105 and the regenerative clock signal 59 so as to output the selected one to a second input terminal to the phase-comparing circuit 107.

The phase-comparing circuit 107, a charge pump 108, a loop filter 109 and a VCO 110 are well-known blocks as constituents of a PLL circuit.

In brief, the phase-comparing circuit 107 detects a phase difference between the output from the multiplexer 104 and the output from the multiplexer 106. As detecting that a signal provided to the first input terminal advances in phase with respect to that provided to the second input terminal, the phase-comparing circuit 107 outputs at its first output terminal a pulse having a pulse width corresponding to the phase difference between the two signals. On the other hand, when the phase-comparing circuit 107 detects that a signal provided to the first input terminal is delayed in phase with respect to that provided to the second input terminal, it outputs at its second output terminal a pulse having a pulse width corresponding to the phase difference between the two signals.

The charge pump 108 supplied with these pulses, is a block of current regulating type and outputs in accordance with the pulse outputted from the phase-comparing circuit 107 any one of three current logical values, i.e., any one of current discharge, current suction and floating. Meanwhile, the current is regulated by a resistor R1 interposed between a power supply line and the charger pump 108. Specifically, as the resistance decreases, the current increases.

The loop filter 109 is a lag-lead type filter composed of resistors and capacitors and determines the follow-controllable frequency range of the PLL circuit. The VCO 110 is an oscillating circuit whose oscillating frequency is determined by a voltage outputted from the loop filter 109. A signal outputted from the VCO 110 becomes after the completion of phase-synchronization the regenerative clock signal 59 synchronized in phase with the binary regenerative signal 57 or the reference clock signal 52.

A. flip-flop 111 which receives the regenerative clock signal 59 at its clock input and the output from the delay circuit 101 at its data input forms a block for sampling the delayed binary regenerative signal 57 in synchronization with the regenerative clock signal 59 so as to produce the synchronized data 58.

A timing control circuit 113 receives the reference clock signal 52 and the sector mark detecting signal 56. This circuit forms a block which starts to count the number of clock pulses from the reference clock signal 52 after when a sector mark 571 is detected on the sector mark detecting signal 56 so as to generates a VFO starting signal 201 indicating the time at which a VFO pattern 572 is to appear on the binary regenerative signal 57 and a VFO ending signal 202 indicating the time at which the VFO pattern 572 is to disappear from the same signal 57.

A synchronizing pattern detecting circuit 116 which receives the synchronized data 58 and the regenerative clock signal 59 is a block for outputting a detection signal 203 when the circuit detects a bit string pattern "100" for synchronization in the VFO pattern 572 at a predetermined number of times or more.

A flip-flop 114 receives the read gate signal 53 inverted by an inverter 112 at its reset input and the VFO starting signal 201 at its clock input while its data input is connected the power supply line.

The thus connected flip-flop 114 regulates the connecting states of the multiplexers 104 and 106 to thereby change over between the operating state of the phase-synchronization with the binary regenerative signal 57 and the waiting state of the phase-synchronization with reference clock signal 52.

A flip-flop 115 receives the VFO starting signal 201 at its preset input, the VFO ending signal 202 at its reset input and the detection signal 203 at its clock input with its data input grounded. The thus connected flip-flop 115 effects the changeover of the multiplexer 105 to thereby control the response speed in phase-synchronization in the PLL circuit 7.

Referring now to FIG. 4 in which a timing chart of the essential signals is shown, the operation of the embodiment thus constructed will hereinafter be described. It should be noted that pulses illustrated in FIG. 4 are shown greater in width for the purpose of easy understanding.

When the controller makes no read request, the read gate signal 53 stays at L-level or in the waiting state. In this state, the flip-flops 114 and 115 are reset and contacts of the multiplexers 104 and 106 are connected to respective b-contacts. The c-contact of the multiplexer 105 is connected to the a-contact. Accordingly, the phase-comparing circuit 107 receives the reference clock signal 52 and the regenerative clock signal 59 so that the regenerative clock signal 59 becomes synchronized with the reference clock signal 52. That is, the regenerative clock signal 59 is formed into a clock signal substantially corresponding to the bit rate of the bit strings recorded on the optical disc being regenerated.

In this state, as the optical head sequentially scans a predetermined sector from its front end position, the regenerative signal 51 is formed into the signal designated at 57.

The sector mark detecting circuit 6, as detecting a sector mark 571, outputs a pulse P1 commanding the detection to the controller. As a result, the controller recognizes that the start position of the sector is being scanned, and makes the read gate signal 53 active or sets it at H-level (at a time of T1) in order to read out the address information 574 in the sector. Accordingly, the reset input in the flip-flop 114 is set at L-level, thereby the forced reset state is released.

The timing control circuit 113 outputs, in synchronization with the trailing edge of the pulse P1 on the sector mark detecting signal 56 (at a time of T2) a pulse P2 indicating the start of a VFO pattern 572 onto the VFO starting signal 201 (at T2 nearly equal to T1). Accordingly, the flip-flops 114 and 115 are both set, therefore the outputs 60 and 61 stay at H-levels H1 and H2, respectively.

In consequence, c-contacts of the multiplexers 104 and 106 are connected to respective a-contacts while the contact of the multiplexer 105 is connected to the b-contact. Accordingly, the first input terminal to the phase-comparing circuit 107 is supplied with the binary regenerative signal 57 which has been delayed by the delay circuit 101. The second input terminal of the same is supplied with the output from the second clock pulse extracting circuit 103.

Hence, the practical PLL circuit made up of the phase-comparing circuit 107, the charge pump 108, the loop filter 109 and the VCO 110, starts nearly from the staring position of the VFO pattern 572a the pull-in operation at the frequency mode for the fast response speed, that is, by comparing the pulse trains of the binary regenerative signal 57 with the pulse train obtained by three-dividing the regenerate clock signal 59.

When the pull-in operation has completed within the duration of the VFO pattern 572a, that is, the regenerative clock signal 59 outputted from the VCO 110 has become synchronized in phase with the binary regenerative signal 57, the sampling by the flip-flop 111 is performed in proper phase. Hence, the flip-flop 111 outputs bit strings '100' indicating the VFO pattern 572a. As a result, when the synchronizing pattern detecting circuit 116 has detected successive bit strings "100" appearing at the predetermined number of times or more (at a time of T3), the circuit 116 sends out a pulse P3 indicating the detection onto the detection signal 203.

This pulse P3 causes the flip-flop 115 to be reset so that the output 61 becomes set at L-level L1. Accordingly, the c-contact of the multiplexer 105 is connected to the a-contact and the second input terminal to the phase-comparing circuit 107 is supplied with the output from the first clock pulse extracting circuit 102.

As a result, the PLL circuit makes a comparison in phase of the pulse extracted from the regenerative clock signal 59 every time any pulse appears on the binary regenerative signal 57, with the pulse itself appearing on the binary regenerative signal 57. That is, the phase-synchronization at a slow response speed starts. Accordingly, the synchronized data 58 is generated based on the regenerative clock signal 59 produced by the phase-synchronization at the slow response speed.

Thereafter, when an address mark 573a appears on the binary regenerative signal 57, detection of address mark 573a is made in the mark detecting circuit 4 based on the thus generated synchronized data 58. Further, when address information 574a appears on the binary regenerative signal 57, the address information 574a is demodulated in the demodulating circuit 5.

On the other hand, suppose that fine defects present on the optical disc cause failure on the binary regenerative signal 57 indicating a VFO pattern 572a, and therefore, the "100" pattern could not be detected at the predetermined number of times within the duration between the time T2 and the time T3 despite that the pull-in operation has been completed.

In this situation, the synchronizing pattern detecting circuit 116 does not output the pulse P3 onto the detection signal 203. Hence, the output 61 from the flip-flop 115 continues to stay at H-level H3 and the operation of the phase-synchronization at the fast response speed goes on. Nevertheless, when the outputting of the VFO pattern 572a almost finishes (at a time T4), the timing control circuit 113 outputs a pulse P4 indicating disappearance of the VFO pattern 572a onto the VFO ending signal 202. Accordingly, the flip-flop 115 is reset whereby the c-contact in the multiplexer 105 is changed over from the b-contact to the a-contact.

As the result of the above operation, the PLL circuit operates in the slow response speed phase-synchronizing mode, whereby the regenerative clock signal 59, stabilized, can be produced without being affected by fine jitters etc., on the binary regenerative signal 57. Accordingly, the detection of the address mark 573a following the VFO pattern 572a as well as the demodulation of the address information 574a will be made pertinently.

Thereafter, at a time of T5 which approximately corresponds to the time a VFO pattern 572b appears, the timing control circuit 113 sends out a pulse P5 indicating the start of the VFO pattern 572b onto the VFO starting signal 201. Accordingly, the flip-flop 115 becomes reset, the c-contact in the multiplexer 105 is connected to the b-contact. As a result, the pull-in operation at the fast response speed resumes, whereby the phase-synchronization with the VFO pattern 572b is effected. Further operations following this are the same as already described.

All the signals during the operation from the time T5 to a time T6 in FIG. 4, are illustrated on the premise that there is neither defect such as of fine scratches on the optical disc nor failure on the binary regenerative signal 57 so that the pattern '100' can be detected on each VFO pattern 572 at the predetermined number of times or more whereby the synchronizing pattern detecting circuit 116 sends out a pulse signal indicating the detection onto the detection signal 203. In this case, before the timing control circuit 113 sends out a pulse onto the VFO ending signal 202, the synchronizing pattern detecting circuit 116 sends out a pulse indicating the detection onto the detection signal 203. This causes the flip-flop 115 to be reset, and the operation followed changes into the slow response speed mode in an earlier stage, so that a stable synchronized state can be kept in a period from then on before the VFO pattern disappears. In the same period, if the detection signal 203 is not delivered out due to the presence of defects on the binary regenerative signal 57, the flip-flop 115 is made to be reset by a pulse P6 launched by the timing control circuit 113 onto the VFO ending signal 202.

As the result of the operation describe above, data demodulated in the demodulating circuit 5 is supplied to the controller, thereby completing the recognition of address of the sector. Therefore, the controller deactivates the read gate signal 53 at the time T6 or sets the signal at L-level. This causes the flip-flop 114 to be reset and therefore the PLL circuit 7 to transit to the waiting state.

The controller having completed the recognition of address detects whether or not the sector is to be read, and if it is positive or the sector is to be read, the controller, in order to read out the data, causes the read gate signal 53 to be set at H-level at a time T7 when a VFO pattern 576 in the data section begins to appear.

Subsequent operations are similar to those performed as to the header section, that is, the phase-synchronization with the VFO pattern 576 at fast response speed is started. Then, a pulse P7 outputted from the synchronizing pattern detecting circuit 116 onto the detection signal 203 or a pulse P8 outputted from the timing control circuit 113 onto the VFO ending signal 202, triggers the phase-synchronizing operation to change into the slow response speed mode. A data mark 577 is detected during the period of phase-synchronization in this slow response speed mode. Data information 578 such as user information etc., is also demodulated.

Next, supplementary explanation as to the above embodiment will be made.

The binary regenerative signal 57 corresponding to the address mark 573 and the address information 574 appearing after the VFO pattern 572 as well as the address mark 577 and the address information 578 after the VFO pattern 576, is composed of bit strings which are coded under (2,7) RLL-modulation. Hence, if the signal of the bit strings is put into to the phase-comparing circuit 107 together with the three-divided signal of the regenerative clock signal 59 delivered from the second clock pulse extracting circuit 103, it is impossible to keep the state of phase-synchronization.

Therefore in order to deal with rotational variations of the optical disc, the timing control circuit 113 is adapted to output the pulse for indicating the end of the VFO pattern 572 or 576 onto the VFO ending signal 202 at a timing earlier to some degree for a margin than the actually ending time of the VFO pattern 572 or 576 in the binary regenerative signal 57.

Figure 5:
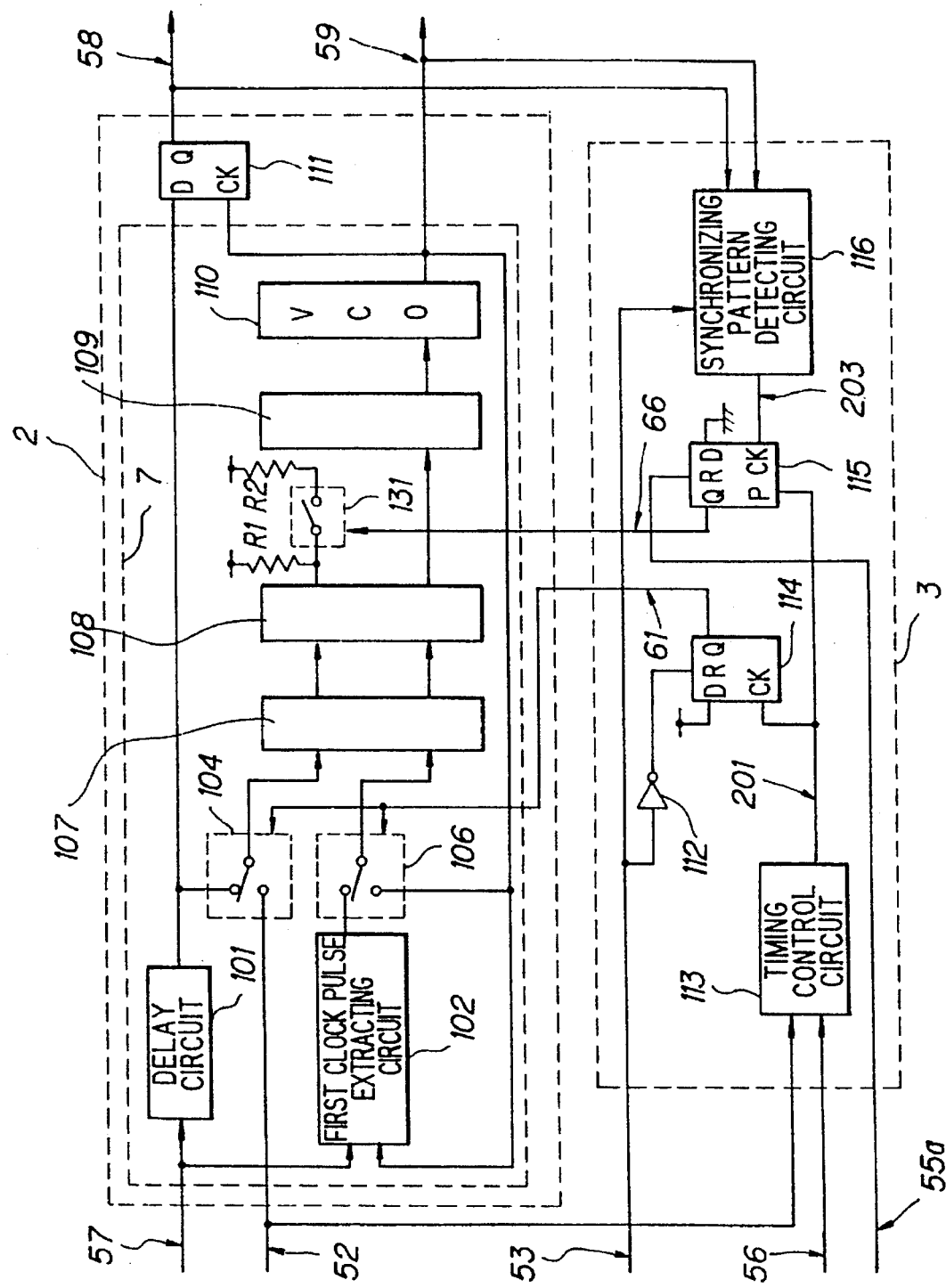
FIG. 5 is a block diagram showing a detailed electric construction of a signal synchronizing circuit and a speed indicating circuit which can be applied to the information regenerating apparatus shown in FIG. 2 as used for the second embodiment.

FIG. 5 is a block diagram showing an electric construction of a signal synchronizing circuit and a speed indicating circuit to be applied to an information regenerating apparatus of a second embodiment of the present invention.

An overall configuration of this embodiment is much the same with that shown in FIG. 2 with slight differences in the configurations of the signal synchronizing circuit 2 and the speed indicating circuit 3 and that the AM/DM detection signal 55 is led to the speed indicating circuit 3 by a broken line 55a. Here, as detailed description of the signal synchronizing circuit 2 and the speed indicating circuit 3 will be made as to the configuration shown in FIG. 5, description as to those shown in FIG. 2 is omitted.

To make the description simple, the same reference numerals used in FIGS. 2 and 3 are allotted to the corresponding blocks in FIG. 5 even if some blocks may include slight differences in their configurations.

Description of the configuration shown in FIG. 5 will be made as only to different portions from those shown in FIG. 3.

As to the PLL circuit 7, the second clock pulse extracting circuit 103 is omitted, and therefore, the multiplexer 105 is also omitted. A switch 131 is added to the charge pump 108. A resistor R2 is added which is connected at its one end to the switch 131 and the other end is connected to the power supply line.

That is, the PLL circuit 7 is constructed so that the current value of discharged current or sucked current by the charge pump 108 is changed over using the switch 131 in order to change the loop gain. At the time of the pull-in operation, the switch 131 is closed to increase current by adding the current through the resistor R2 to thereby set up a fast response speed for the pull-in operation. On the other hand, when the pull-in operation has been completed, the switch 131 is opened so that only the current flowing through the resistor R1 is applied therefore the current is decreased, to thereby set up a slow response speed for the phase-synchronization that keeps the synchronization operation stable.

As the change of the response speed is effected by switching of the current applied to the charge pump 108, it is possible to achieve the phase-synchronization at the fast response speed even when pulse strings appearing on the binary regenerative signal 57 are those of address marks 573 and address information 574 and therefore coded under the (2,7) RLL-modulation.

An output 66 from the flip-flop 115 for commanding the switching of the response speed sends out is a signal for controlling the connection of the switch 131. Further, a reset input to the flip-flop 115 is provided with an AM/DM detection signal 55a outputted from the mark detecting signal 4. The timing control circuit 113 generates only the VFO starting signal 201 but no VFO ending signal 202.

That is, the speed indicating circuit 3 counts the number of clock pulses from the regenerative clock signal 59 from a time of the generation of the sector mark detection signal 56 showing the detection of a sector mark 571 as a reference point. The speed indicating circuit 3 takes a timing of a VFO pattern 572 beginning to appear on the binary regenerative signal 57, based on the count, and instructs the PLL circuit 7 to make the response speed fast every time when a VFO pattern 572 appears. Further, an instruction of making the response speed slow is given to the PLL circuit 7 every time the mark detecting circuit 4 detects an address mark 573.

To sum up, this configuration differs from that shown in FIG. 3 in the following two points. That is, the PLL circuit 7 is constructed so that the response speed is changed by the switching of the current applied to the charge pump 108; and the speed indicating circuit 3 instructs the PLL circuit 7 to slow down the response speed when the mark detecting circuit 4 presents detection of an address mark 573.

The operation of the thus constructed second embodiment of the present invention will be now described with reference to FIG. 4, as required.

Before the detection of a sector mark 571, the flip-flops 114 and 115 are both reset and the regenerative clock signal 59 is in a form of a signal which is synchronized in phase with the reference clock signal 52. When a pulse P1 is sent out onto the sector mark detection signal 56, the timing control circuit 113 launches a pulse P2. Accordingly, the switch 131 is closed and the PLL circuit 7 starts the pull-in operation in the fast response speed mode in which the loop gain is large.

When the synchronizing pattern detecting circuit 116 sends out a pulse P3 onto the detection signal 203 after completion of the pull-in operation with a VFO pattern 572a, the flip-flop 115 is reset in time with the delivery of the pulse P3 so that the switch 131 is opened. Accordingly, the PLL circuit 7, thereafter, effects the phase-synchronization at the slow response speed. As a result, the subsequent detection of an address mark 573a and the demodulation of address information 574a are performed properly.

Despite that the pull-in operation has been completed, the timing control circuit 113 may fail to deliver the pulse P3 onto the detection signal 203 due to defects on the binary regenerative signal 57. Even in such a case, the PLL circuit 7 continues the phase-synchronization in the fast response speed mode with pulse trains corresponding to an address mark 573a. As a result, the mark detection circuit 4 necessarily detects the address mark 573a from the synchronized data 58 outputted from the flip-flop 111. Accordingly, a pulse indicating the detection of the address mark 573a is sent out onto the AM/DM detection signal 55, so as to reset the flip flow 115.

As the flip-flop 115 is reset, the switch 131, receiving the output 66, opens its connection so as to reduce the current applied to the charge pump 108. This allows the PLL circuit 7 to produce the regenerative clock signal 59 under the stable phase-synchronization having the slow response speed with a small loop gain. As a result, subsequent address information 574a can be reproduced and demodulated properly.

The same operation as described above is subjected to the VFO pattern 576 and data mark 577 in the data section, and if the VFO pattern 576 has fine defects, the data information 578 can again be reproduced properly.

It should be noted that the present invention is not limited to the above embodiment. In this embodiment, as to the phase-locked loop circuit 7 shown in FIG. 3, description has been made on the configuration where the output from the first clock pulse extracting circuit 102 or the output from the second clock pulse extracting circuit 103 is used as the signal to be compared in phase with respect to the regenerative clock signal 59 whereby the response speed for phase-synchronization is changed over. However, and it is possible, as an example of other method, to construct configuration in which the output current from the charge pump 108 is varied to change over the response speed for phase-synchronization.

As to the timing control circuit 113, description has been made on the case in which pulses are launched respectively in correspondence with the VFO pattern 572 and 576 onto the VFO ending signal 202, but it is also possible to construct such a configuration that, in regenerating a header section, if the synchronizing pattern detecting circuit 116 has sent out a pulse onto the detection signal 203, after the instance, the timing control circuit 113 is prohibited to send out a pulse onto the VFO starting signal 201.

As apparent from the foregoing detailed description, in the information regenerating apparatus of the first aspect of the present invention, the phase-locked loop circuit is constructed in such a manner as to perform phase-synchronization with the regenerative signal at two different pull-in speeds. The speed indicating circuit, based on the counting of the number of clock pulses from the reference clock signal from a time of the generation of a sector mark detection signal showing the detection of the sector mark as a reference point, instructs the phase-locked loop circuit to set up a fast response speed every time the pull-in pattern appears on the regenerative signal, and instructs the phase-locked loop circuit to set up a slow response speed every time the pull-in pattern disappears from the regenerative signal.

In the information regenerating apparatus of the second aspect of the present invention, the phase-locked loop circuit is constructed in such a manner as to perform phase-synchronization with the regenerative signal at two different pull-in speeds. Further, the mark detecting circuit detects an address mark on synchronized data obtained by sampling the regenerative signal in synchronization with the regenerative clock produced in the phase-locked loop circuit. Then, the speed indicating circuit, based on the counting of the number of clock pulses from the reference clock signal from a time of the generation of a sector mark detection signal showing the detection of the sector mark as a reference point, gives an instruction to the phase-locked loop circuit to accelerate the response speed thereof every time the pull-in pattern appears on the regenerative signal, and instructs the phase-locked loop circuit to slow down the response speed thereof every time the mark detecting circuit indicates the detection of an address mark.

In the information regenerating apparatus of the third aspect of the present invention, the phase-locked loop circuit is constructed in such a manner as to perform phase-synchronization with the regenerative signal at two different pull-in speeds. Further, the synchronizing pattern detecting circuit detects a pull-in pattern on synchronized data obtained by sampling the regenerative signal in synchronization with the regenerative clock produced in the phase-locked loop circuit. Then, the speed indicating circuit, based on the counting of the number of clock pulses from the reference clock signal from a time of the generation of a sector mark detection signal showing the detection of the sector mark as a reference point, gives an instruction to the phase-locked loop circuit to accelerate the response speed thereof every time the pull-in pattern appears on the regenerative signal, and gives an instruction to the phase-locked loop circuit to slow down the response speed thereof when the synchronizing pattern detecting circuit detects a pull-in pattern or when the pull-in pattern disappears from the regenerative signal.

Thus, according to the information regenerating apparatuses of the first, second and third aspects of the present invention, the response speed of the phase-locked loop is made fast every time a pull-in pattern appears, whereas the response speed is made slow when an address mark following the pull-in pattern appears. Accordingly, it is possible to perform phase-synchronization with all the VFO patterns at the fast response speed while it is possible to perform phase-synchronization with all the information areas at the slow response speed.

In the apparatus according to the second aspect of the present invention, even in a case where the readout speed of the recorded data is fluctuated, it is possible to accomplish the phase-synchronization even with a pull-in pattern having some defects at a higher probability since the phase-synchronization at the fast response speed is continued until a pull-in pattern completely comes to an end, regardless of the fluctuation and therefore the duration within which the synchronizing operation is performed at the fast response speed is long. In other words, it is possible to complete the pickup of data with a reduced error ratio.

In the apparatus according to the third aspect of the present invention, when pull-in patterns have been detected properly with no defect during VFO intervals on the binary regenerative signal, the response speed changes into the slow mode in the earlier stage, so that the operation can be made in the stable state in a more prolonged period of time.

What is claimed is:

1. An information regenerating apparatus, wherein recorded data constructed of a sector mark and a following header section having a plurality of data sets each having a pull-in pattern, an address mark and address information, is read out to form a regenerative signal which in turn is used to regenerate information, comprising:

- a phase-locked loop circuit for performing phase-synchronization with said regenerative signal at two different pull-in speeds;
- a mark detecting circuit which detects said address mark on synchronized data obtained by sampling said regenerative signal in synchronization with a regenerative clock produced in said phase-locked loop circuit; and
- a speed indicating circuit which, based on the counting of the number of clock pulses from a reference clock signal from a time of the generation of a sector mark detection signal showing the detection of said sector mark as a reference point, gives an instruction to said phase-locked loop circuit to accelerate the response speed thereof every time said pull-in pattern appears on said regenerative signal, and which instructs said phase-locked loop circuit to slow down the response speed thereof every time said mark detecting circuit indicates the detection of an address mark.

2. An information regenerating apparatus, wherein recorded data having a sector mark, a following header section having data sets consisting of pull-in patterns, address marks and address information, and a data section having a data set of a pull-in pattern, a data mark and user information, is read out to form a regenerative signal which in turn is used to regenerate information, comprising:

- a phase-locked loop circuit for performing phase-synchronization with said regenerative signal at two different pull-in speeds;
- a synchronizing pattern detecting circuit for detecting a pull-in pattern; and
- a speed indicating circuit which, based on the counting of the number of clock pulses from a reference clock signal from a time of the generation of a sector mark detection signal showing the detection of said sector mark as a reference point, instructs said phase-locked loop circuit to set up a fast response speed every time said pull-in pattern appears on said regenerative signal, and which instructs said phase-locked loop circuit to set up a slow response speed upon occurrence of one of said synchronizing pattern detecting circuit detecting a pull-in pattern or when said pull-in pattern disappears from said regenerative signal.

3. The apparatus of claim 2 wherein said speed indicating circuit instructs said phase-locked loop circuit to set up a slow response speed in accordance with the first to occur of said synchronizing pattern detecting circuit detecting said pull-in pattern or said pull-in pattern disappearing from said regenerative signal.

* * * * *